US010540688B2

(12) United States Patent
Shimpa et al.

(10) Patent No.: US 10,540,688 B2
(45) Date of Patent: *Jan. 21, 2020

(54) ELECTRONIC PERIODICAL ADVERTISEMENT

(71) Applicant: Target Brands, Inc., Minneapolis, MN (US)

(72) Inventors: Krisandra Shimpa, Minneapolis, MN (US); Heather Grudt, Minneapolis, MN (US); Richard Schindeldecker, III, Minneapolis, MN (US); Richard Brinkerhoff, San Francisco, CA (US); Marie Hartmann, San Francisco, CA (US); Karen Jackson Patrick, San Francisco, CA (US); Evan Mager, San Francisco, CA (US); Elizabeth Tervenski, San Francisco, CA (US)

(73) Assignee: Target Brands, Inc., Minneapolis, MN (US)

( * ) Notice: Subject to any disclaimer, the term of this patent is extended or adjusted under 35 U.S.C. 154(b) by 236 days.

This patent is subject to a terminal disclaimer.

(21) Appl. No.: 15/498,108

(22) Filed: Apr. 26, 2017

(65) Prior Publication Data

US 2017/0228782 A1 Aug. 10, 2017

Related U.S. Application Data

(62) Division of application No. 12/965,374, filed on Dec. 10, 2010, now Pat. No. 9,665,884.

(51) Int. Cl.
*G06Q 30/00* (2012.01)
*G06Q 30/02* (2012.01)
*G06Q 50/00* (2012.01)

(52) U.S. Cl.
CPC ..... *G06Q 30/0257* (2013.01); *G06Q 30/0241* (2013.01); *G06Q 30/0251* (2013.01); *G06Q 30/0255* (2013.01); *G06Q 30/0267* (2013.01); *G06Q 30/0269* (2013.01); *G06Q 30/0271* (2013.01); *G06Q 30/0276* (2013.01); *G06Q 50/01* (2013.01)

(58) Field of Classification Search
CPC .......... G06Q 30/0251; G06Q 30/0241; G06Q 30/0255; G06Q 30/0269; G06Q 30/0271; G06Q 30/0267; G06Q 50/01; G06Q 30/0257
See application file for complete search history.

(56) References Cited

U.S. PATENT DOCUMENTS

| | | | | |
|---|---|---|---|---|
| 6,035,280 A * | 3/2000 | Christensen | ......... | G06Q 20/387 186/52 |
| 2002/0036654 A1* | 3/2002 | Evans | ........... | G06F 17/243 715/744 |
| 2011/0022423 A1* | 1/2011 | Shank | ........... | G06Q 10/02 705/5 |

* cited by examiner

*Primary Examiner* — Raquel Alvarez
(74) *Attorney, Agent, or Firm* — Merek, Blackmon & Voorhees, LLC

(57) ABSTRACT

An electronic periodical advertisement including a number of time dependent offers is generated, e.g., using a computing device. The offers are organized into a number of modules. A default set of the modules is presented to a user. The default set of modules is edited to generate a user-defined set of modules. A user-defined electronic periodical advertisement including the user-defined set of modules is presented to the user.

20 Claims, 13 Drawing Sheets

ELECTRONIC PERIODICAL ADVERTISEMENT

The subject patent application is a divisional of U.S. patent application Ser. No. 12/965,374 filed on Dec. 10, 2010 from which priority is claimed under 35 USC § 120. The entire content of U.S. patent application Ser. No. 12/965,374 is incorporated herein by reference.

BACKGROUND

Advertisements are an important mechanism by which retailers attract and retain customers. Many types of advertisements have been transposed to or transformed for electronic mediums, systems, and methods of delivery, e.g. e-mail, Internet web sites, CD-ROMs, and the like. One type of advertisement that has been used to bring existing and new customers into retail stores is the periodical advertisement, which includes, e.g., the weekly circular. Weekly circulars have commonly been delivered to customers in paper via weekend editions of local newspapers, such as the Sunday edition of a local newspaper. While sometimes effective for retailers in traditional print form, periodical advertisements have not yet been well adapted to electronic systems which generally permit a higher degree of customization and tailoring to individual customer preferences than previous mediums. Some electronic periodical advertisements currently available amount to a digitized version of the print counterpart, presenting digitized versions of the pages of the print ad via an electronic device or system. Some existing electronic periodical advertisements provide a modicum of customization, e.g. offering different ad content based on location. However, there exists a need for further improvement in the generation, formulation, delivery, and customization of electronic periodical advertisements.

SUMMARY

This disclosure is directed to electronic periodical advertisements that may be edited and customized on a per user basis. In one example, a method includes generating, with a computing device, an electronic periodical advertisement including a number of time dependent offers, organizing the offers into a number of modules, presenting a default set of the modules, editing the default set of modules to generate a user-defined set of modules, and presenting a user-defined electronic periodical advertisement including the user-defined set of modules.

In another example, a system includes means to generate an electronic periodical advertisement including a number of time dependent offers, means to organize the offers into a number of modules, means to present a default set of the modules, means to edit the default set of modules to generate a user-defined set of modules, and means to present a user-defined electronic periodical advertisement including the user-defined set of modules.

In another example, a computer-readable storage medium includes instructions for causing a programmable processor to generate an electronic periodical advertisement including a number of time dependent offers, organize the offers into a number of modules, present a default set of the modules, edit the default set of modules to generate a user-defined set of modules, and present a user-defined electronic periodical advertisement including the user-defined set of modules.

In another example, an electronic system includes an advertisement engine, a user interface, and a data repository. The advertisement engine is configured to generate an electronic periodical advertisement including a number of time dependent offers and organize the offers into a number of modules. The user interface is configured to present a default set of the modules, edit the default set of modules to generate a user-defined set of modules, and present a user-defined electronic periodical advertisement including the user-defined set of modules. The data repository is configured to store data related to the electronic periodical advertisement and the user-defined electronic periodical advertisement.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
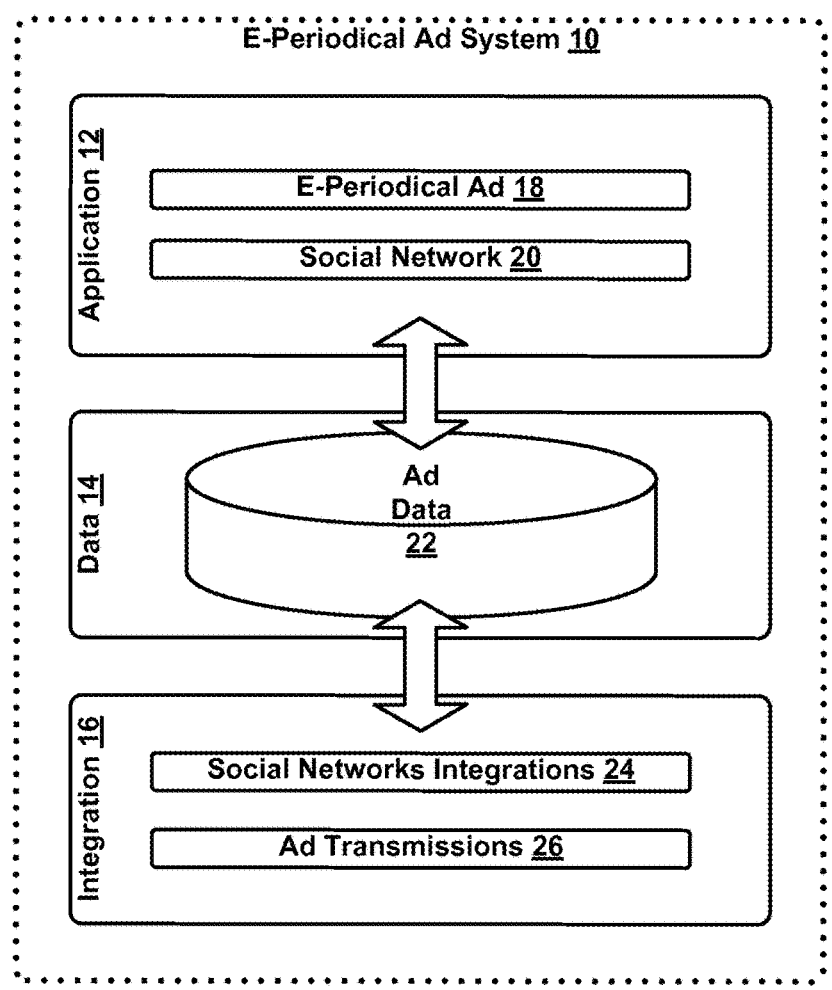
FIG. 1 is a block diagram logically illustrating an example electronic periodical advertisement system.

FIG. 1 is a block diagram logically illustrating example electronic periodical advertisement (e-periodical ad) system 10 including application layer 12, data layer 14, and integration layer 16. Application layer 12 includes e-periodical ad application 18 and social network application 20, which may each be configured to generate and present interactive components and controls for viewing, editing, and otherwise interacting with e-periodical ads. Data layer 14 includes ad data 22. Ad data 22 may include any off-the-shelf, open source, or proprietary database or any other data storage and retrieval mechanism appropriate for storing, searching, and relating digital data.

In addition to application layer 12 and data layer 14, e-periodical ad system 10 includes integration layer 16. Integration layer 16 includes one or more mechanisms for integrating e-periodical ad system 10 with other external systems, as well as data. In the example of FIG. 1, integration layer 16 of e-periodical ad system 10 includes social networks integrations 24 and ad transmissions 26. Social networks integrations 24 may be employed to connect and integrate e-periodical ad system 10 to one or more social network systems, including, e.g., Facebook, My Space, Linked in, or the like. Ad transmissions 26 may be configured to manage data communications between e-periodical ad system 10 and external user-devices or systems, including, e.g., user mobile phones and e-mail systems.

System 10 is configured to generate an e-periodical ad. A periodical advertisement is an advertisement that is generated on a periodic basis and includes offers, e.g. product and/or service offers, which are limited in time. In other words, a periodical advertisement is a mechanism by which a number of time dependent offers are delivered to a number of users on a periodic basis, e.g. weekly, monthly, quarterly, and the like. An e-periodical ad is a periodical advertisement that is generated, delivered, and interacted with, in whole or in part, via an electronic medium, e.g. a computer-readable storage medium or a computer generated software system.

System 10 is configured to generate an e-periodical ad that is editable and customizable on a per user basis. In one example, e-periodical ad application 18 of system 10 may generate an e-periodical ad including a number of time dependent offers. Data related to the e-periodical ad, including data related to the time dependent offers may be retrieved from ad data 22 by ad application 18. The time dependent offers included in e-periodical ads generated by ad application 18 of system 10 may include, e.g., product price offers or product coupons. Additionally, one or more of the time dependent offers may include an expiration time defining a day on which the offer will expire, which may be stored in ad data 22 and associated therein with the offer to which the expiration time pertains. The time dependent offers may include additional information, which may be stored in ad data 22 of data layer 14 of system 10. For example, ad data 22 may store offer price, pictures, descriptions, and other relevant information for each time dependent offer included in e-periodical ads generated by ad application 18 of system 10.

In one example, e-periodical ad application 18 organizes the time dependent offers into a number of modules. A module included in e-periodical ads generated by ad application 18 of system 10 may include, e.g., a categorical module including a number of time dependent offers belonging to one category. For example, one module in which offers are organized by e-periodical ad application 18 may include a product category module, which includes a number of offers for products belonging to one category, e.g. groceries, clothing, toys, and the like. In another example, one module in which offers are organized by e-periodical ad application 18 may include a theme module, which includes a number of offers that belong to the same theme, e.g. products that may be used for a particular type of event, e.g. a party. Other modules into which e-periodical ad application 18 organize offers may include a top offers module, e.g. a list of top offers according to popularity or quantity of discount, or a coupons module, including a number of product or service coupons, e.g., that may be redeemed in a store. In other examples, ad application 18 may organize time dependent offers of e-periodical ads into other types or differently defined modules.

E-periodical ad application 18 of system 10, in addition to organizing time dependent offers into a number of modules, may present a default set of the modules. Upon accessing system 10, ad application 18 may generate and present a default e-periodical ad to users including a default set of modules. The default set of modules may include a sub-set of all the modules that may be included in an e-periodical ad generated by ad application 18 of system 10. In this manner, system 10, and, in particular, ad application 18 may provide users with a starting point for generating a user-defined e-periodical ad.

E-periodical ad application 18 may also provide controls for editing the default set of modules to generate a user-defined set of modules. Editing the default set of modules via ad application 18 of system 10 may include any interaction with the system that effects a change to the modules to generate a user-defined set of modules that differs from the default set. In one example, one or more modules may be removed from the default set of modules to generate the user-defined set of modules using e-periodical ad application 18. In another example, ad application 18 may edit the default set of modules by adding one or more modules to the default set of modules to generate the user-defined set of modules. In another example, one or more modules of the default set of modules may be reordered to generate the user-defined set of modules using e-periodical ad application 18.

In one example, the user-defined set of modules may be stored in ad data 22. Additionally, e-periodical ad application 18 may manage and store user data, e.g. user profile and credentials, in ad data 22 of data layer 14 of system 10 and associate particular user data with, e.g. a user-defined set of modules for each respective user. In any event, a user-defined e-periodical ad including the user-defined set of modules may then be presented by e-periodical ad application 18 of system 10.

E-periodical ads generated by system 10, and, in particular, modules of the ads, e.g. the default and/or the user-defined set of modules may be presented in a variety of manners by ad application 18. In one example, e-periodical ad application 18 presents each module in an e-periodical ad as an interactive panel including controls to view and select one or more of the offers included in the module. An interactive panel is a self-contained software component for displaying and facilitating user-interaction with a module of an e-periodical ad generated by system 10. In some examples, the interactive panel is the mechanism by which system 10 delivers e-periodical ad content including time dependent offers organized into modules to users.

Ad application 18 may include a number of different controls in the interactive panels by which the application presents the modules of an e-periodical ad. For example, interactive panels presented by ad application 18 may include input buttons, icons, drop-down lists, radio buttons, check-boxes, and other user controls for viewing and interacting with time dependent offers of an e-periodical ad. In one example, e-periodical ad application 18 may provide one or more user controls for viewing all of the offers in a module on a single page, e.g. with a scroll bar where appropriate based on the number of offers, or divided into several pages through which the user may scroll with other controls, e.g. arrow buttons indexing forward and/or backward one page of offers in the module. In another example, ad application 18 may present interactive panels with other user controls for selecting time dependent offers including, e.g., input buttons, icons, drop-down lists, radio buttons, check-boxes, and the like. For example, a user of ad application 18 may click on an image representing a product offer presented in an interactive panel, which is linked in system 10 to additional information about the product offer, including, e.g., product price, offer expiration, product description and/or specifications.

E-periodical ad application 18 may also provide a number of different options for viewing the interactive panels of e-periodical ads generated by system 10. In one example, ad application 18 may arrange the interactive panels laterally with respect to one another and present one or more of the interactive panels in a viewing space. In such examples, e-periodical ad application 18 may also provide controls for moving the interactive panels with respect to the viewing space such that the panels presented in the viewing space change in response to the control. For example, ad application 18 may provide a scroll bar by which the interactive panels can be moved in one or both directions laterally to scroll through and present successive ones of the panels in the viewing space.

In another example, e-periodical ad application 18 may arrange the interactive panels in a number of rows and present all of the interactive panels arranged in the rows in a viewing space. In one example, ad application 18 arranges the rows of interactive panels in stacked relationship to one another. In another example, e-periodical ad application 18 may order the stacked rows of interactive panels such that a first of the interactive panels is arranged in a bottom row and a last of the interactive panels is arranged in a top row. In another example, however, ad application 18 may order the rows of panels differently, including, e.g., ordering the stacked rows such that a first of the interactive panels is arranged in a top row and a last of the interactive panels is arranged in a bottom row.

In addition to generating a user-defined e-periodical ad including a user-defined set of modules, each of which includes a number of time dependent offers, ad application 18 of system 10 may provide a number of additional functions related to e-periodical ads, including, e.g., generating and transmitting alerts regarding time dependent offers and user-defined shopping lists including one or more offers in an ad. For example, ad application 18 of system 10 may generate an alert associated with one of the offers in a user-defined e-periodical ad. The alert may, e.g., relate to the expiration time of the offer and may function to inform a user when or how long until the offer will expire. The offer alert generated by ad application 18 may include an audible alert, e.g. a sound emitted from a user's mobile phone, a visual alert, e.g. a text and/or graphical message sent to a user, or a tactile alert, e.g. causing a user's mobile phone to vibrate. In one example, ad transmissions 26 of integration layer 16 of system 10 may transmit alerts generated by ad application 18 to a user in, e.g., an electronic mail or Short Messaging Service (SMS) message.

In another example, e-periodical ad application 18 may generate a shopping list including one or more of the time dependent offers in a user-defined e-periodical ad generated by system 10. In one example, ad application 18 provides controls for selecting, dragging, and deselecting offers from one or more modules of the user-defined e-periodical ad to an interactive shopping list pane generated and presented by the ad application. In other examples, other user controls may be used to generate an interactive shopping list including, e.g. drop-down lists, radio buttons, pop-up windows or lists, or other user interface elements. In one example, e-periodical ad application 18 may also present expiration times for each of the time dependent offers that have been added to the interactive shopping list pane. Additionally, ad transmissions 26 of integration layer 16 may, in one example, transmit the shopping list generated by ad application 18 to a user in, e.g., an electronic mail or Short Messaging Service (SMS) message.

In some examples, e-periodical ad system 10 may interoperate with one or more social network systems, e.g. Facebook, My Space, or Linked in. As such, example system 10 of FIG. 1 includes social network application 20 of application layer 12 and social networks integrations 24 of integration layer 16. In one example, e-periodical system 10 is configured to publish a user-defined e-periodical ad to a social network platform via social networks integrations 24. The user-defined e-periodical ad including a user-defined set of modules may then be presented by social network application 20. Social network application 20 may be configured to present the user-defined e-periodical ad publicly such that the user's ad content is shared among a group of users, or friends on the social network platform. Additionally, social network application 20, as well as e-periodical ad application 18, may be configured to rate offers in the user-defined electronic periodical advertisement. The offer ratings may then be presented by social network application 20 via the social network platform. Social network application 20 may be configured to, as with the user's ad content, present the offer ratings publicly such that the ratings are shared among a group of users, or friends on the social network platform. In some examples, offers may be rated by e-periodical ad application 18 and system 10 may publish the offer ratings to a social network platform via social networks integrations 24.

An example implementation of e-periodical ad system 10 is described below with reference to FIG. 2. However, in some examples, e-periodical ad system 10 may be implemented on one or more of any number of different types of computing devices of various configurations. For example, e-periodical ad system 10 may be implemented on one or more workstations, servers, or other stationary computing devices, or combinations thereof. Additionally, some portions of e-periodical ad system 10 may be implemented on portable computing devices, including, e.g., mobile telephones, personal data assistants (PDAs), or laptop, notebook, netbook, or tablet computers.

Although the type and particular configuration of the computing device or devices on which e-periodical ad system 10 is implemented may vary, in general, the system may include one or more programmable processors configured to execute instructions on and retrieve data from and store data on a memory to carry out one or more functions attributed to the e-periodical ad system in this disclosure. The processors employed to execute the functions of e-periodical ad system 10 may each include one or more processors, such as one or more microprocessors, digital signal processors (DSPs), application specific integrated circuits (ASICs), field programmable gate arrays (FPGAs), programmable logic circuitry, and the like, either alone or in any suitable combination.

The memory of the computing device or devices on which e-periodical ad system 10 is implemented may include separate memories for storing programming instructions, e-periodical ad data, offer parameters and other data, information related to systems and external ad data integrations and synchronizations, and any other information used by e-periodical ad system 10 or another system connected to or associated with system 10. In this manner, the memory of the computing device or devices on which e-periodical ad system 10 is implemented may store, e.g., ad data 22. As mentioned above, in some examples, the memory of the computing device or devices on which e-periodical ad system 10 is implemented stores program instructions that, when executed by a processor, cause e-periodical ad system 10 to perform the functions attributed to the system in this disclosure.

Not only may e-periodical ad system 10 be implemented on a variety of types of hardware devices with various physical configurations, but the device or devices on which system 10 is implemented may also include a variety of software configurations. For example, e-periodical ad system 10 may be implemented on a computing device or a number of devices that are configured to operate based on one of a variety of different operating systems, including, e.g., proprietary systems like Microsoft's Windows, Apple's MAC OS, or open source systems like UNIX, Linux, or Google's Chrome or Android.

E-periodical ad system 10, and in particular, application layer 12 of the system may employ a number of different mechanisms to enable user interaction with the system. In general, however, different components of application layer 12 of e-periodical ad system 10 may include a user interface (UI), including, e.g., a graphical user interface (GUI) that includes a variety of input and output controls. In some examples, application layer 12 of e-periodical ad system 10 may include a GUI from which users may retrieve information from and add information to system 10. The GUI of e-periodical ad system 10 may be implemented via a variety of platforms, including, e.g., being presented via operating system applications, web-based applications in a web browser, or combinations of different types of application platforms.

As described above, e-periodical ad system 10 is configured to generate an e-periodical ad that is editable and customizable on a per user basis. The foregoing example e-periodical ad system 10 includes a number of example applications, including e-periodical ad application 18 and social network application 20. However, more or fewer applications relevant to the generation, viewing, and editing of e-periodical ads may be included in examples according to this disclosure. For example, e-periodical ad system 10 may be configured to permit users to generate a number of different customized e-periodical ads, which vary based on the frequency with which the ads are distributed, e.g. weekly, monthly, quarterly, etc. In such an example, system 10, and, in particular, application layer 12 may include, e.g., a weekly ad application, monthly ad application, and quarterly ad application.

Figure 2:
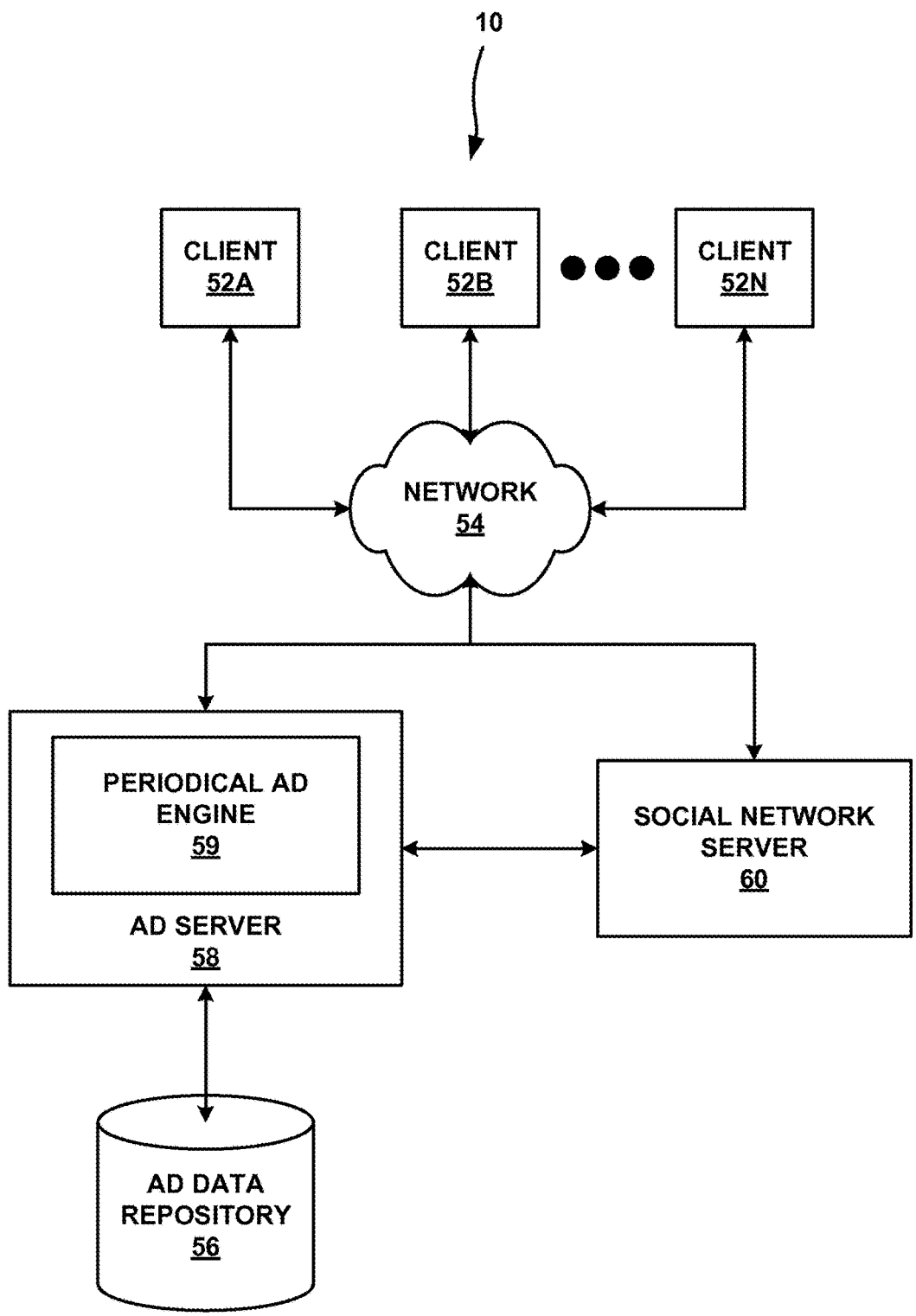
FIG. 2 is a block diagram illustrating an example implementation of the electronic periodical advertisement system of FIG. 1.

FIG. 2 is a block diagram illustrating an example implementation of e-periodical ad system 10 including clients 52A-52N (collectively "clients 52"), network 54, ad data repository 56, ad server 58, and social network server 60. Clients 52 are communicatively connected to ad data repository 56 and ad server 58 via network 54. Clients 52 and ad server 58 are configured to communicate to present e-periodical ads to users and allow the users to customize the ads, create offer alerts, generate shopping lists, and post content to a social network platform, e.g. via social network server 60.

Clients 52 may include any number of different portable electronic clients, including, e.g., cellular phones, personal digital assistants (PDAs), laptop computers, portable gaming devices, portable media players, e-book readers, and the like.

Network 54 may include one or more terrestrial and/or satellite networks interconnected to provide a means of communicatively connecting clients 52 to ad data repository 56 and ad server 58, as well as social network server 60. For example, network 54 may be a private or public local area network (LAN) or Wide Area Network (WAN), including, e.g., the Internet. Network 54 may include both wired and wireless communications according to one or more standards and/or via one or more transport mediums. For example, network 54 may include wireless communications according to one of the 802.11 or Bluetooth specification sets, or another standard or proprietary wireless communication protocol. Network 54 may also include communications over a terrestrial cellular network, including, e.g. a GSM (Global System for Mobile Communications), CDMA (Code Division Multiple Access), EDGE (Enhanced Data for Global Evolution) network. Data transmitted over network 54, e.g., from clients 52 to data repository 16 may be formatted in accordance with a variety of different communications protocols. For example, all or a portion of network 54 may be a packet-based, Internet Protocol (IP) network that communicates data from clients 52 to ad data repository 56 in Transmission Control Protocol/Internet Protocol (TCP/IP) packets, over, e.g., Ethernet via Category 5 cables.

Data repository 56 may include, e.g., a standard or proprietary database or other data storage and retrieval mechanism. Data repository 56 may be implemented in software, hardware, and combinations of both. For example, data repository 56 may include proprietary database software stored on one of a variety of storage mediums on a data storage server connected to network 54 and configured to send to and collect ad data from clients 52. Storage mediums included in or employed in cooperation with data repository 56 may include, e.g., any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Ad server 58 includes periodical ad engine 59, which may be employed, as described below, to facilitate generation, presentation, and editing of e-periodical ads accessed by users via clients 52. Server 58 may be any of several different types of network devices. For example, ad server 58 may include a data processing appliance, web server, specialized media server, personal computer operating in a peer-to-peer fashion, or another type of network device. Additionally, although the example of FIG. 2 includes one ad server 58, other examples may include a number of collocated or distributed servers configured to provide periodical ad content to clients 52, including data stored in data repository 56 individually or in cooperation with one another.

Although ad data repository 56 and ad server 58 are illustrated as separate components in the example of FIG. 2, in other examples the two components may be combined or may each be distributed amongst more than one device. For example, ad server 58 may store ad data repository 56 and control the repository to periodically retrieve ad data and present it to clients 52 and receive data from the clients and store it in the repository. In another example, ad data repository 56 may be distributed among a number of separate devices, e.g. a number of database servers, and ad server 58 may include a number of co-located or distributed servers configured to operate individually and/or in cooperation with one another and with the various devices comprising data repository 56.

Regardless of the particular configuration of system 10, or other example systems according to this disclosure, the system may be configured to generate an e-periodical ad that is editable and customizable on a per user basis. In one example, ad engine 59 on ad server 58 may generate an e-periodical ad including a number of time dependent offers. Data related to the e-periodical ad, including data related to the time dependent offers may be retrieved from ad data repository 56 by ad engine 59. The time dependent offers included in e-periodical ads generated by ad engine 59 may include, e.g., product price offers or product coupons. Additionally, one or more of the time dependent offers may include an expiration time defining a day on which the offer will expire, which may be stored in ad data repository 56 and associated therein with the offer to which the expiration time pertains. The time dependent offers may include additional information, which may be stored in ad data repository 56. For example, data repository 56 may store offer price, pictures, descriptions, and other relevant information for each time dependent offer included in e-periodical ads generated by periodical ad engine 59.

In one example, periodical ad engine 59 organizes the time dependent offers into a number of modules. A module included in e-periodical ads generated by ad engine 59 may include, e.g., a categorical module including a number of time dependent offers belonging to one category, including, e.g., product category, theme, top offers, and coupon modules. In other examples, ad engine 59 may organize time dependent offers of e-periodical ads into other types or differently defined modules.

Periodical ad engine 59, in addition to organizing time dependent offers into a number of modules, may present a default set of the modules to clients 52. Upon one or more of clients 52 accessing system 10, ad engine 59 may generate and present a default e-periodical ad including a default set of modules to the clients. The default set of modules may include a sub-set of all the modules that may be included in an e-periodical ad generated by ad engine 59. In this manner, system 10, and, in particular, ad engine 59 may provide clients 52 with a starting point for generating a user-defined e-periodical ad.

Periodical ad engine 59 may also provide controls for clients 52 to edit the default set of modules to generate a user-defined set of modules. Editing the default set of modules via clients 52 may include any interaction with the system that effects a change to the modules to generate a user-defined set of modules that differs from the default set. In one example, clients 52 may remove one or more modules from the default set of modules to generate the user-defined set of modules. In another example, clients 52 may edit the default set of modules by adding one or more modules to the default set to generate the user-defined set of modules. In another example, clients 52 may reorder one or more modules of the default set of modules to generate the user-defined set of modules.

In one example, the user-defined set of modules may be stored in ad data repository 56. Additionally, periodical ad engine 59 may manage and store user data, e.g. user profile and credentials collected for different users from clients 52, in ad data repository 56 and associate particular user data with, e.g. a user-defined set of modules for each respective user. In any event, a user-defined e-periodical ad including the user-defined set of modules may then be presented by periodical ad engine 59 on clients 52. E-periodical ads generated by system 10, and, in particular, modules of the ads, e.g. the default and/or the user-defined set of modules may be presented on clients 52 in a variety of manners by ad engine 59, including, e.g., the presentation techniques described above with reference to FIG. 1.

In addition to generating a user-defined e-periodical ad including a user-defined set of modules, each of which includes a number of time dependent offers, ad engine 59 may provide a number of additional functions related to e-periodical ads, including, e.g., generating and transmitting alerts regarding time dependent offers and user-defined shopping lists including one or more offers in an ad. For example, ad engine 59 of system 10 may generate an alert associated with one of the offers in a user-defined e-periodical ad. The alert may, e.g., relate to the expiration time of the offer and may function to inform a user when or how long until the offer will expire. The offer alert generated by ad engine 59 may include an audible alert, e.g. a sound emitted from a user's mobile phone, a visual alert, a text and/or graphical message sent to a user, or tactile alert, e.g. causing a user's mobile phone to vibrate. In one example, ad engine 59 transmits an alert via network 54 in, e.g., an electronic mail or Short Messaging Service (SMS) message.

In another example, periodical ad engine 59 may generate a shopping list including one or more of the time dependent offers in a user-defined e-periodical ad generated by system 10. For example, ad engine 59 may provide controls to clients 52 for selecting, dragging, and deselecting offers from one or more modules of the user-defined e-periodical ad to an interactive shopping list pane generated by the ad engine and presented on the clients. In other examples, ad engine 59 may provide other user controls to clients 52 for generating an interactive shopping list including, e.g. drop-down lists, radio buttons, pop-up windows or lists, or other user interface elements. In one example, clients 52 may also present expiration times for each of the time dependent offers that have been added to the interactive shopping list pane. Additionally, ad engine 59 may, in one example, transmit the shopping list via network 54 in, e.g., an electronic mail or Short Messaging Service (SMS) message.

In some examples, e-periodical ad system 10 may interoperate with one or more social network systems, e.g. Facebook, My Space, or Linked in. As such, in the example of FIG. 2, clients 52, ad server 58, and ad engine 59 are connected to social network server 60 via network 54. In one example, ad engine 59 is configured to publish a user-defined e-periodical ad to social networking server 60 via network 54. The user-defined e-periodical ad including a user-defined set of modules may then be presented by social network server 60 on clients 52. Social network server 60 may be configured to present the user-defined e-periodical ad publicly such that the user's ad content is shared among a group of users, or friends on the social network platform. Additionally, social network server 60, as well as periodical ad engine 59, may be configured to rate offers in the user-defined e-periodical ad. The offer ratings may then be presented on clients 52 by social server 60 via network 54. Social network server 60 may be configured to, as with a user's ad content, present the offer ratings publicly such that the ratings are shared among a group of users, or friends on the social network platform. In some examples, offers may be rated by periodical ad engine 59, which may publish the offer ratings to social network server 60 via network 54.

The functions associated with ad engine 59 of ad server 58 for generating, presenting, and editing e-periodical ads may be implemented in any combination of server-side and client-side components configured to execute instructions to carry out the described functions. For example, ad engine 59 may generate a default e-periodical ad including a number of time dependent offers organized into a default set of modules on server 58. Ad engine 59 may then deliver ad data and server-side programs or other components executable on client 52 to process the data related to the default e-periodical ad and present the default ad to a user on the client. In another example, however, ad engine 59 may generate the default e-periodical ad and the graphical presentation of the ad on server 58 and deliver the presentation to client 52 without requiring any specialized client-side programs or other processes, i.e. all or substantially all of the processing related to the ad is executed by the ad engine on server 58. In another example, ad engine 59 may deliver the data and client-side programs or other components executable by client 52 that are necessary to generate an e-periodical ad and present the ad on the client, i.e. all or substantially all of the processing related to the ad is executed on the client.

Figure 3:
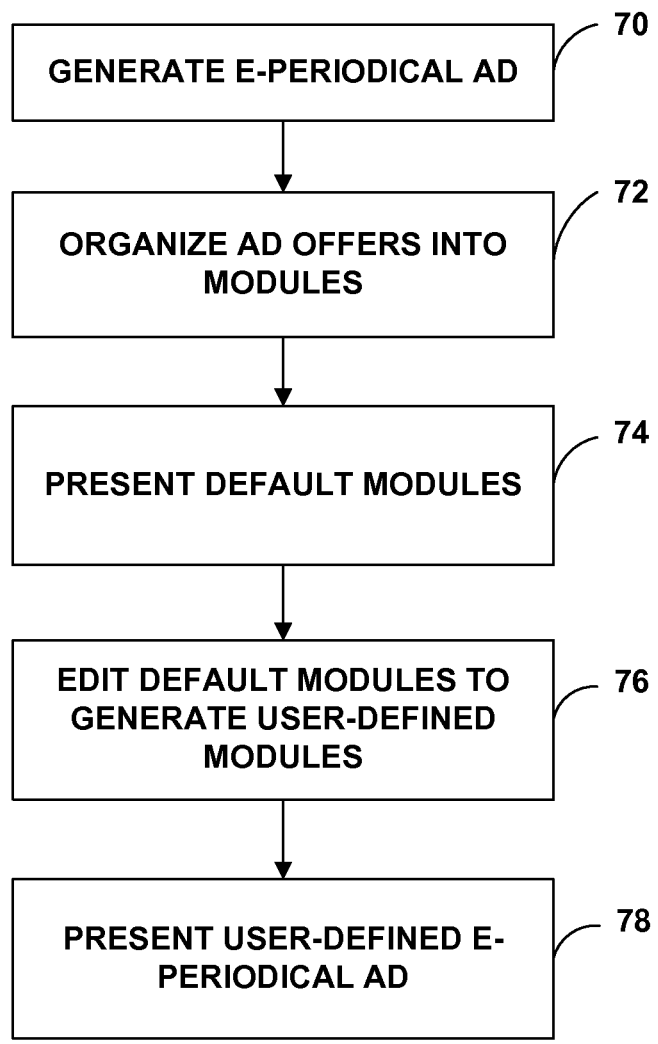
FIG. 3 is a flowchart illustrating an example method of generating a user-defined electronic periodical advertisement.

FIG. 3 is a flowchart illustrating an example method of generating a user-defined e-periodical ad. The method of FIG. 3 includes generating an e-periodical ad including a number of time dependent offers (70), organizing the offers into a number of modules (72), presenting a default set of the modules (74), editing the default set of modules to generate a user-defined set of modules (76), and presenting a user-defined e-periodical ad including the user-defined set of modules (78).

The functions of the method of FIG. 3 for generating a user-defined e-periodical ad are described below as carried out by the example e-periodical ad system of FIGS. 4-13.

However, in other examples, one or more of the functions of the method of FIG. 3 may be carried out by other devices or systems that differ from the example system of FIGS. 4-13 in constitution and arrangement. For example, the system of FIGS. 4-13 is delivered in a web application in a standard web browser, e.g., via the Internet. However, in another example, one or more of the functions associated with the example method of FIG. 3 may be delivered to users via a different application platform, including, e.g., a computer operating system based application, like a Windows or Mac OS application, or a mobile device application, like an iPhone application. Additionally, the example of FIGS. 4-13 includes integration with an example social network platform, which may include, e.g. Facebook, My Space, or Linked in.

FIGS. 4-13 are a series of images illustrating an example e-periodical ad system. The example system is delivered to users over the Internet via a web browser, including, e.g., Microsoft's Internet Explorer, Apple's Safari, Google's Chrome, or Mozilla's Firefox browsers. The system employs a combination of technologies and standards to generate and deliver content to users, including, e.g., Hypertext Markup Language (HTML), Adobe's Flash, and a social network platform. As noted above, however, the system of FIGS. 4-13 is merely illustrative, and other examples in accordance with this disclosure may differ from this system. For example, e-periodical ad systems in accordance with this disclosure may employ a wide variety of technologies and standards to generate and deliver interactive content to users, including, e.g., Dynamic Hypertext Markup Language (DHTML), Extensible Markup Language (XML), Sun Microsystems' Java, Javascript, Visual Basic, VB Script, Microsoft's .NET, Cold Fusion, Active X, Perl, and the like.

Figure 4:
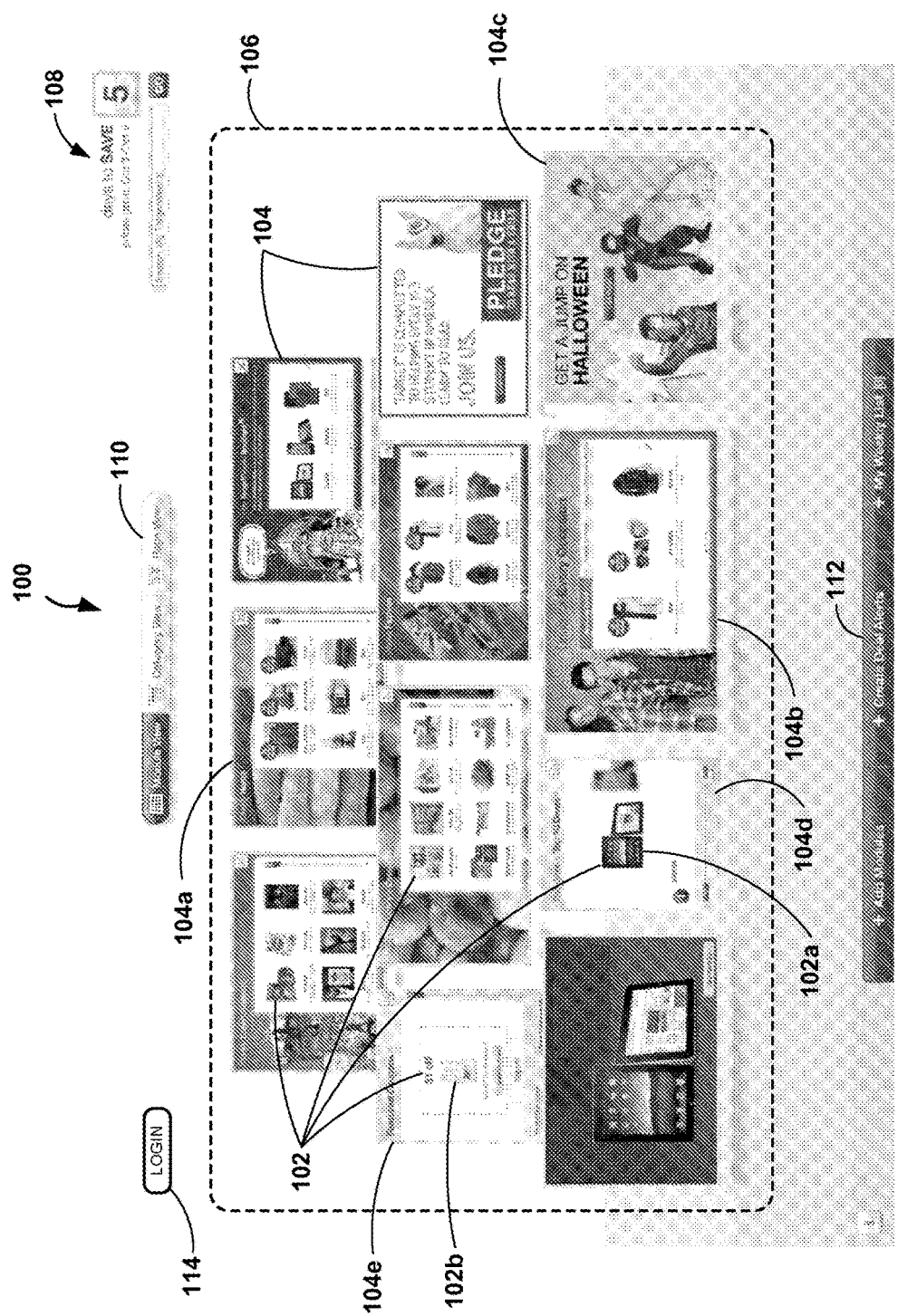
FIGS. 4-13 are a series of images illustrating an example electronic periodical advertisement system.

Referring again to FIG. 3, the example method includes generating an e-periodical ad including a number of time dependent offers (70). In FIG. 4, the example e-periodical ad system, My WeeklyAd, generates electronic weekly advertisement (e-weekly ad) 100 including a number of time dependent offers 102. Data related to e-weekly ad 100, including data related to time dependent offers 102 may be retrieved by My WeeklyAd from a database or other organized aggregation of data. Time dependent offers 102 included in e-weekly ad 100 may include, e.g., product price offers, e.g. product price offer 102a for a tablet computer, or product coupons, e.g. product coupon 102b for a container of laundry detergent. Additionally, one or more of time dependent offers 102 may include an expiration time defining a day on which the offer will expire. In the view of FIG. 4, one expiration time 108 for all the offers 102 for e-weekly ad 100 is presented to users as a daily countdown to the expiration. My WeeklyAd also presents the time period, i.e. the dates of the week over which e-weekly ad 100 and time dependent offers 102 included therein are offered. Time dependent offers 102 may include additional information, including, e.g., offer price, pictures, descriptions, and other relevant information for each time dependent offer included in e-weekly ad 100 generated by My WeeklyAd.

In the example of FIG. 4, My WeeklyAd also presents additional controls and components related to e-weekly ad 100, including view menu 110 for controlling the manner in which offers 102 of the ad are presented, customization menu 112 for editing modules 104 and creating alerts and shopping lists, and social network login 114, for integrating e-weekly ad 100 with a social network platform. Each of these additional features of My WeeklyAd and e-weekly ad 100 are described in detail below.

In addition to generating an e-periodical ad including a number of time dependent offers (70), the method of FIG. 3 includes organizing the offers into a number of modules (72). My WeeklyAd, in the example of FIG. 4, organizes time dependent offers 102 into a number of modules 104. Modules 104 included in e-weekly ad 100 may include, e.g., a categorical module including a number of time dependent offers 102 belonging to one category. For example, one of modules 104 in which offers 102 are organized by My WeeklyAd may include product category module 104a, which includes a number of offers for products belonging to one category, home products. In another example, one of modules 104 in which offers 102 are organized by My WeeklyAd may include theme module 104b, which includes a number of offers that belong to the same theme, e.g. products that may be used for a party. Other theme modules may include product offers 102 that are appropriate for a time of year or particular holiday, including, e.g., theme module 104c including product offers for Halloween. Other modules into which offers 102 may be organized include, e.g., top offers modules, e.g. top ten deals module 104d, or featured coupons module 104e, including a number of product or service coupons, e.g., that may be redeemed in a store. In other examples, My WeeklyAd may organize time dependent offers 102 of e-weekly ad 100 into other types or differently defined modules.

The method of FIG. 3 also includes presenting a default set of the modules (74) into which the offers of the e-periodical ad are organized. In one example, the eleven modules 104 presented by My WeeklyAd in FIG. 4 may be a default set of all of the modules that may be presented to a user accessing e-weekly ad 100. My WeeklyAd may present a default set of modules 104 to users in a variety of formats and arrangements. In the view of FIG. 4, the default set of modules 104 are presented in a number of rows in viewing space 106. The rows of modules 104 of e-weekly ad 100 are arranged in stacked relationship to one another. To the extent My WeeklyAd orders modules 104, e.g. from a first module to a last, in one example, the stacked rows of modules may be arranged such that a first of the modules is arranged in the bottom row and a last of the modules is arranged in the top row. In another example, however, My WeeklyAd may order the rows of modules 104 differently, including, e.g., ordering the stacked rows such that a first of the modules is arranged in the top row and a last is arranged in the bottom row.

Figure 5:

In another example, as illustrated in FIG. 5, My WeeklyAd may arrange modules 104 of e-weekly ad 100 laterally with respect to one another and present one (or more) of the modules in viewing space 106. In the example of FIG. 5, My WeeklyAd also provides controls for moving modules 104 with respect to viewing space 106 such that different modules may be presented in the viewing space. In particular, scroll bar 116 may be manipulated, e.g. the scroll bar may be moved to the right in the view of FIG. 5 to move modules 104 from right to left, or the scroll bar may be moved to the left to move the modules from left to right.

As described above, e-weekly ad 100 may include a number of different modules 104, which may be defined categorically by including a number of time dependent offers 102 belonging to one category in each respective module. Categorical modules in which My WeeklyAd may organize offers 102 may include, e.g., product category, theme, top offers, and coupon modules. FIGS. 6A-7B illustrate different examples of categorical modules 104 that may be included in e-weekly ad 100.

Figure 6A:
Figure 6B:

FIGS. 6A and 6B are images illustrating two product category modules 104f and 104g, which include offers related to grocery products and fashion, respectively. As noted above, My WeeklyAd may present modules 104 of e-weekly ad 100 to users in a variety of formats and arrangements. In the example of e-weekly ad 100 in FIGS. 4-13, My WeeklyAd presents each of modules 104 of the ad as an interactive panel including controls to view and select one or more of offers 102 included in the module. FIGS. 6A and 6B illustrate grocery and fashion modules 104f and 104g, respectively, presented as example interactive panels 126 and 124, respectively. An interactive panel is a self-contained software component for displaying and facilitating user-interaction with one of modules 104 of e-weekly ad 100 generated by My WeeklyAd.

User controls included in interactive module panels, e.g. panels 126 and 128 of FIGS. 6A and 6B, may include, e.g., input buttons, icons, drop-down lists, radio buttons, check-boxes, and other user controls for viewing time dependent offers 102 in a variety of arrangements. For example, grocery module 104f and fashion module 104g include all of offers 102 in each module presented in interactive panels 126 and 128, respectively, on single pages 103 and 132, respectively. Users may navigate through and view different offers 102 in grocery module 104f and fashion module 104g using scroll bars 134 and 136, respectively, to move pages 130 and 132 up and down.

Figure 7A:
Figure 7B:
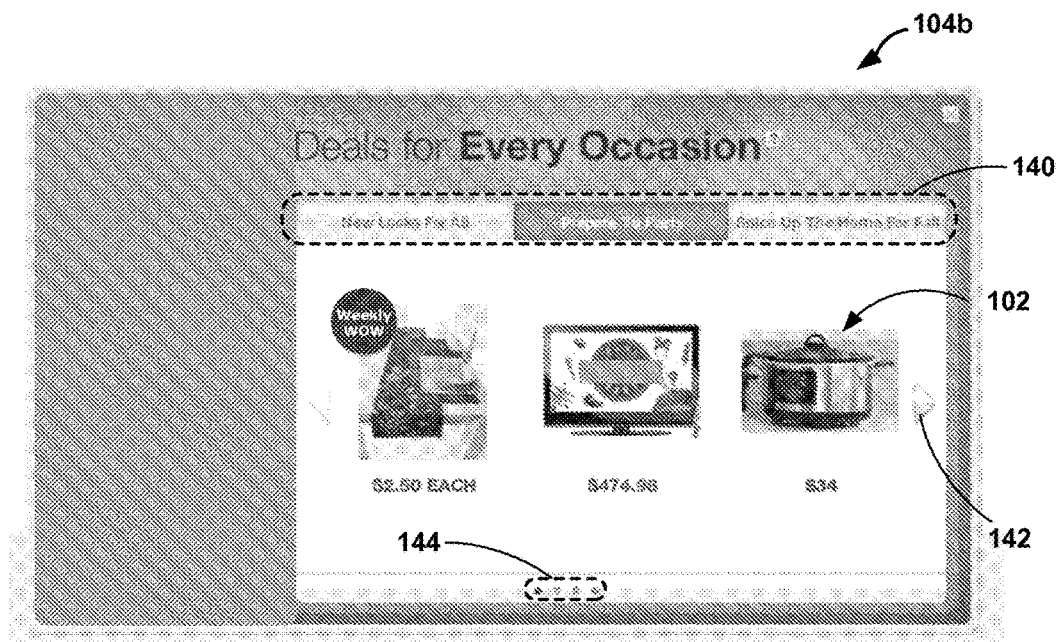

FIGS. 7A and 7B illustrate theme module 104b of e-weekly ad 100 and additional controls included in the interactive panels by which My WeeklyAd presents this module. Theme module 104b is directed to product offers organized around a number of different themes, including seasonal clothing and home décor. Theme module 104b includes multi-dimensional user controls by which users may view and interact with offers 102 in each of the themes included in the module in a number of different ways. For example, module 104b includes tabs 140 for navigating between the different themes and arrows 142 and page icons 144 for navigating through offers 102 included in each theme of the module. In FIG. 7A, the seasonal clothing theme "New Looks For All" of module 104b is selected using tabs 140. In FIG. 7B, the party theme "Prepare To Party" of module 104b is selected using tabs 140. In one example, My WeeklyAd may change the images and/or colors associated with module 104b based on the theme selected via tabs 140. In any event, having selected a theme, offers 102 included in the selected theme are displayed in a number of pages, which may be navigated using arrows 142, to index forward and backward (right and left in the view of FIGS. 7A and 7B) and page icons 144 to jump to anyone of the pages of offers in the them, e.g. the themes of both FIGS. 7A and 7B each include four pages.

In another example, interactive panels 126 and 128, or other mechanisms by which modules 104 of e-weekly ad 100 are presented, may include additional user controls, including, e.g., input buttons, icons, drop-down lists, radio buttons, check-boxes, and other user controls for selecting time dependent offers. For example, in the examples of FIGS. 6A and 6B, an image representing one of product offers 102 presented in, e.g., interactive panel 126 or 128, may be linked by My WeeklyAd to additional information about the product offer, including, e.g., product price, offer expiration, product description and/or specifications. For example, clicking on one of offers 102 in panels 126 and 128 may launch a new web page, or other presentation mechanism or viewing space, in which My WeeklyAd presents additional information for the offer and options to purchase one or more products associated with the offer.

Figure 8:
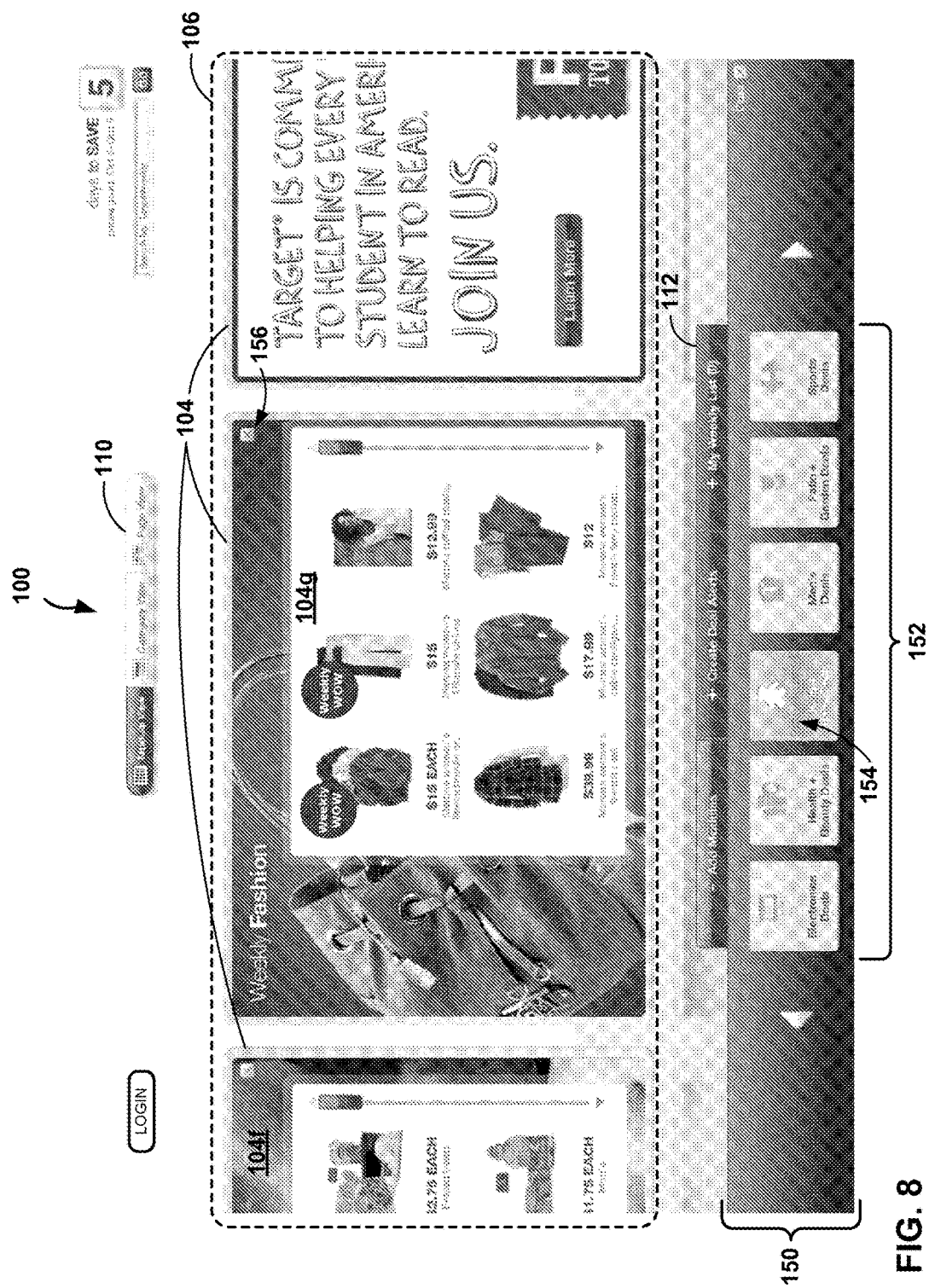

Referring again to FIG. 3, the example method, in addition to presenting a default set of the modules (74), includes editing the default set of modules to generate a user-defined set of modules (76). Editing the default set of modules may include, e.g., adding, removing, or reordering modules to generate the user-defined set of modules. In the example of FIG. 8, modules may be added to and removed from the default set of modules included in e-weekly add 100 using customization menu 112. In particular, selecting the "Add Modules" tab of customization menu 112 provides controls for adding and removing modules to and from the default set of modules included in e-weekly ad 100 by My WeeklyAd.

In FIG. 8, selecting the "Add Modules" tab of customization menu 112 launches interactive pane 150, in which additional modules 152 are presented for addition to the default set of modules included in e-weekly add 100. In one example, one or more of modules 152 may be added to e-weekly ad 100 by selecting a module in pane 150, dragging the module into viewing space 106, and deselecting the module to add it to the default set of modules to generate a user-defined set of modules. For example, "Kids+Baby Deals" module 154 may be selected from interactive pane 150. Module 154 may be dragged from pane 150 into viewing space 106. In one example, module 154 may be positioned between grocery module 104f and fashion module 104g, and deselected to add the module to e-weekly ad 100.

Modules included in e-weekly add 100, e.g. included in the default set of modules, may also be removed. In FIG. 8, for example, fashion module 104g may be removed from e-weekly ad 100 by clicking close button 156. Other modules may be added to and removed from e-weekly add 100, e.g. to and from the default or user-defined set of modules, in a similar fashion as described above with reference to the example of FIG. 8. Additionally, any of modules 104 in e-weekly add 100 may be reordered by selecting the module, dragging the module to the desired position with respect to the other modules in the add, and deselecting the module to place it in the new position. Modules 104 of e-weekly ad 100 may be reordered in both the stacked row arrangement illustrated in FIG. 4 and the lateral arrangement of FIG. 5 and FIG. 8.

The example method of FIG. 3 also includes presenting a user-defined e-periodical advertisement including the user-defined set of modules (78). In example e-weekly ad 100, the user-defined e-weekly ad may include a number of modules 104 that define the user-defined set of modules. The user-defined set of modules included in a user-defined e-weekly ad generated by My WeeklyAd may include, e.g., one or more of modules 152 from FIG. 8 added to the e-weekly ad, one or more of the default set of modules removed from the ad, and/or reordered modules. A user-defined e-weekly ad including the user-defined set of modules may be presented by My WeeklyAd in a manner consistent with the techniques described with reference to FIGS. 4-7B. For example, My WeeklyAd may present a user-defined e-weekly ad with modules 104 arranged in stacked rows as illustrated in the example of FIG. 4 or laterally with respect to one another as illustrated in FIG. 5. Additionally, My WeeklyAd may present one or more of modules 104 in the user-defined set included in a user-defined e-weekly ad as interactive panels including a variety of controls for viewing and interacting with the offers 102 presented in each panel.

Figure 9:
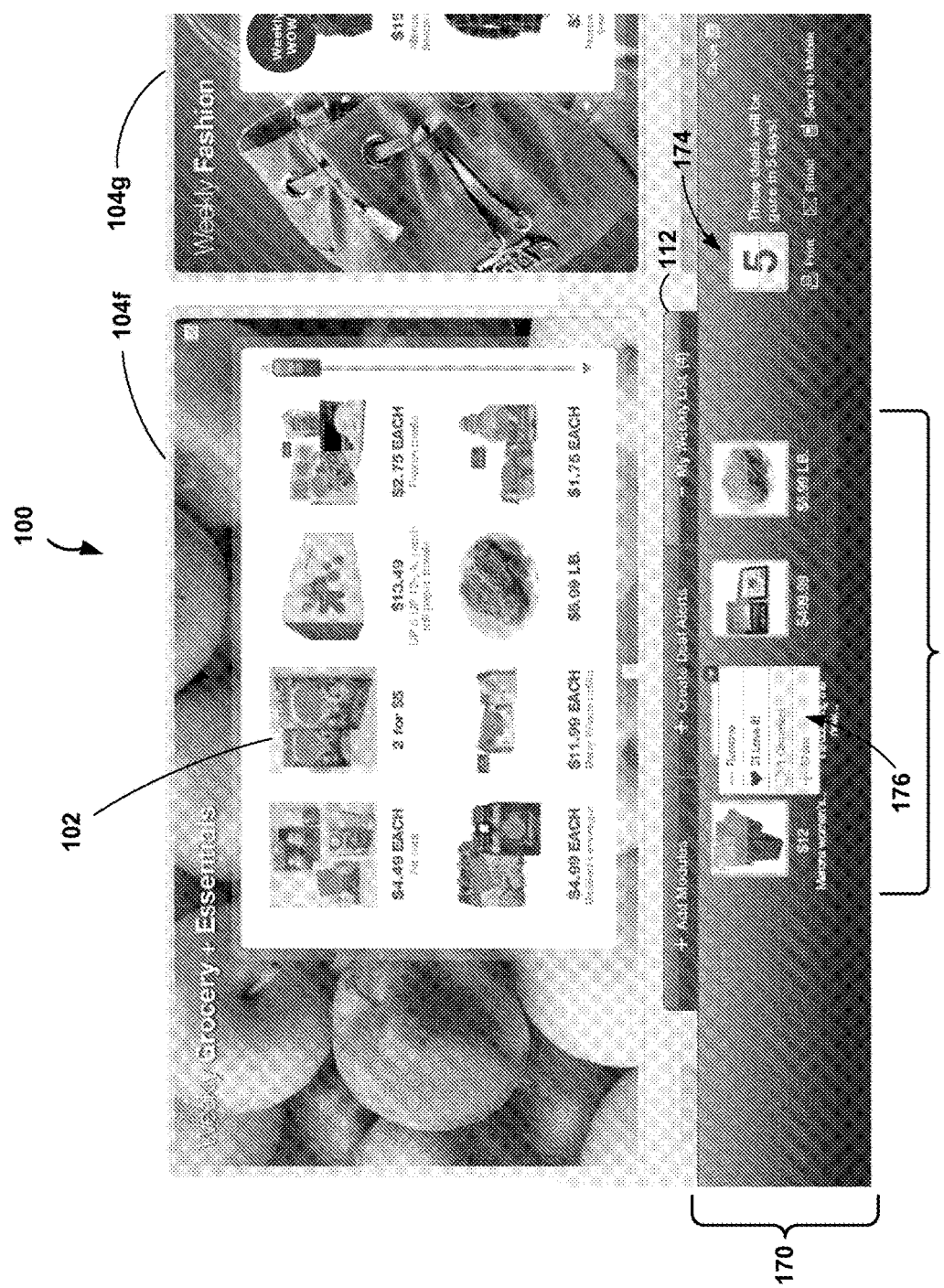

FIGS. 9-13 illustrate additional functions of example e-weekly ad 100 generated by My WeeklyAd, including, e.g., custom alerts and shopping lists, social network integration, and alternative ad presentation paradigms. The method of FIG. 3, in one example, may include generating a shopping list including one or more offers in a user-defined e-periodical ad. In FIG. 9, a custom shopping list is generated by accessing customization menu 112 of e-weekly ad 100. In particular, selecting the "My Shopping List" tab of customization menu 112 launches interactive pane 170, in which shopping list 172 including offers already added to the list are presented. In one example, one or more offers 102 may be added to shopping list 172 in pane 170 by selecting an offer in, e.g., grocery module 104f, dragging the offer into interactive pane 170, and deselecting the offer to add it to the list. In another example, one or more offers 102 may be added to shopping list 172 in pane 170 by hovering a mouse cursor over an offer and clicking an icon associated with the offer to activate a pop-up list that includes an option for adding the offer to the shopping list.

Interactive pane 170 in FIG. 9 also displays expiration time 174 for the offers included in shopping list 172 as a daily countdown to the expiration. My WeeklyAd also presents the time period, i.e. the dates of the week over which the offers included in shopping list 172 are offered. Additionally, for each of the offers included in shopping list 172, My WeeklyAd may provide pop-up menu 176, through which users may remove the offer, rate or view other user ratings of the offer, as well as comment on the offer and share the offer with other users, e.g. via an integration with a social network platform. In one example, offers 102 included in e-weekly ad 100 may be rated using a scale including "Love it!" for a positive rating and "No thanks" for a neutral or negative rating. However, other rating schemes may be employed in examples according to this disclosure, including, e.g. quantitative rating scales, e.g. a scale from 1-N, or other qualitative rating scales, e.g. love it, like it, whatever, no thanks, and never.

In some examples, shopping lists of offers 102 from e-weekly ad 100 may be transmitted to peripheral devices and/or external systems. For example, shopping list 172 and the offers and associated information included therein may be transmitted by My WeeklyAd to a user's e-mail by inputting an e-mail address via e-weekly ad 100, and, in particular, controls presented in interactive pane 170. In another example, shopping list 172 may be transmitted by My WeeklyAd to a user's mobile telephone by inputting a phone number via e-weekly ad 100, and, in particular, controls presented in interactive pane 170. In another example, shopping list 172 may be transmitted by My WeeklyAd to a printer. In another example, My WeeklyAd may publish shopping list 172 to a social network platform, including, e.g., publishing the shopping list to a social network platform page.

Figure 10:
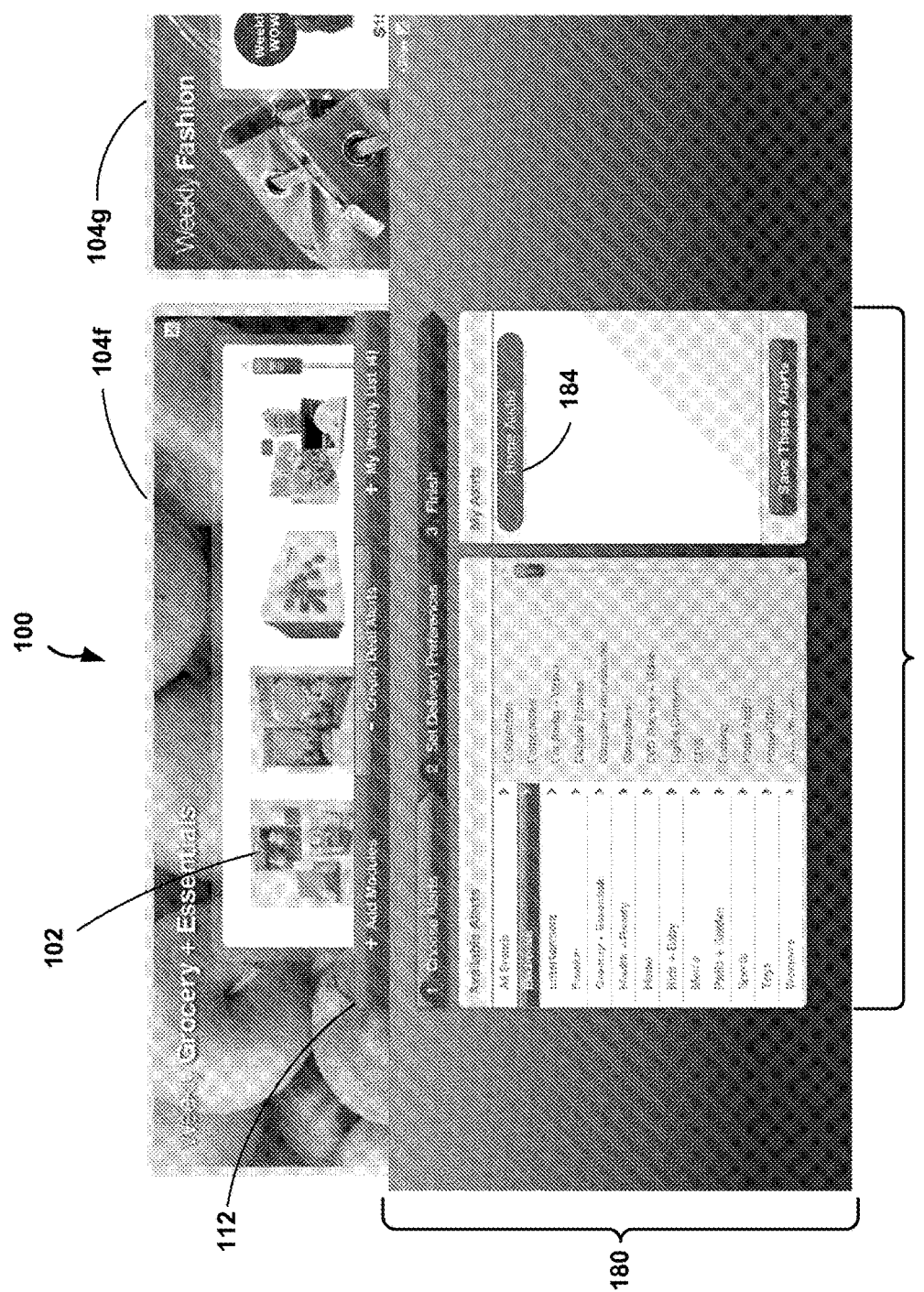

The method of FIG. 3, in one example, may include generating an alert associated with an offer in a user-defined e-periodical ad. In FIG. 10, offer alerts may be generated and configured by accessing customization menu 112 of e-weekly ad 100. In particular, selecting the "Create Deal Alerts" tab of customization menu 112 launches interactive pane 180, in which custom alerts may be generated, configured, and transmitted. In the example of FIG. 10, alerts may be generated for offers related to categories and sub-categories of products. The alerts may be configured to communicate new offers for products in the selected categories or the expiration of existing offers. In any event, e-weekly ad 100 presents product categories and sub-categories of products in alert menu 182. In the example of FIG. 10, alert 184 is created for Electronics, and, in particular, Home Audio Electronics product offers by using alert menu 182 in interactive pane 180.

After generating alerts using alert menu 182 in interactive pane 180 of e-weekly ad 100, delivery preferences for the alerts may be configured. In one example, alert 184 may be transmitted, in a similar fashion to shopping lists, to peripheral devices or external systems. For example, alert 184 for Home Audio Electronics product offers may be transmitted by My WeeklyAd to a user's e-mail by inputting an e-mail address via e-weekly ad 100, and, in particular, controls presented via alert menu 182 in interactive pane 180. In another example, alert 184 may be transmitted by My WeeklyAd to a user's mobile telephone by inputting a phone number via controls presented via alert menu 182 in interactive pane 180.

In some examples, offer alerts may persist across multiple instances of an e-periodical ad, as well as other user specific configuration settings for e-periodical ads in examples according to this disclosure. As explained above, e-periodical ads are generated and distributed periodically, e.g. weekly. Some user-defined configuration settings related to e-periodical ads according to this disclosure may persist across multiple ads, e.g. for multiple weeks. For example, as illustrated in FIG. 10, alert 184 for Home Audio Electronics product offers may be saved. In one example, My WeeklyAd may collect and manage user credentials, e.g. usernames and passwords, in order to identify returning users and associate the user credentials with user settings saved in a data repository employed by the system. In another example, however, My WeeklyAd may piggyback on third-party service provider systems by using user credentials already collected by the third-party, including, e.g., e-mail providers, social networks, and the like. In one example, users of My WeeklyAd may store and retain customization settings for e-weekly ad 100, e.g. user-defined set of modules to include in multiple instances of the weekly ad or saved offer alerts like alert 184 from FIG. 10, using credentials from a Facebook account. In another example, a user of My WeeklyAd may store and retain e-periodical ad settings using credentials from an e-mail account, e.g. a MyYahoo! e-mail account.

Figure 11:
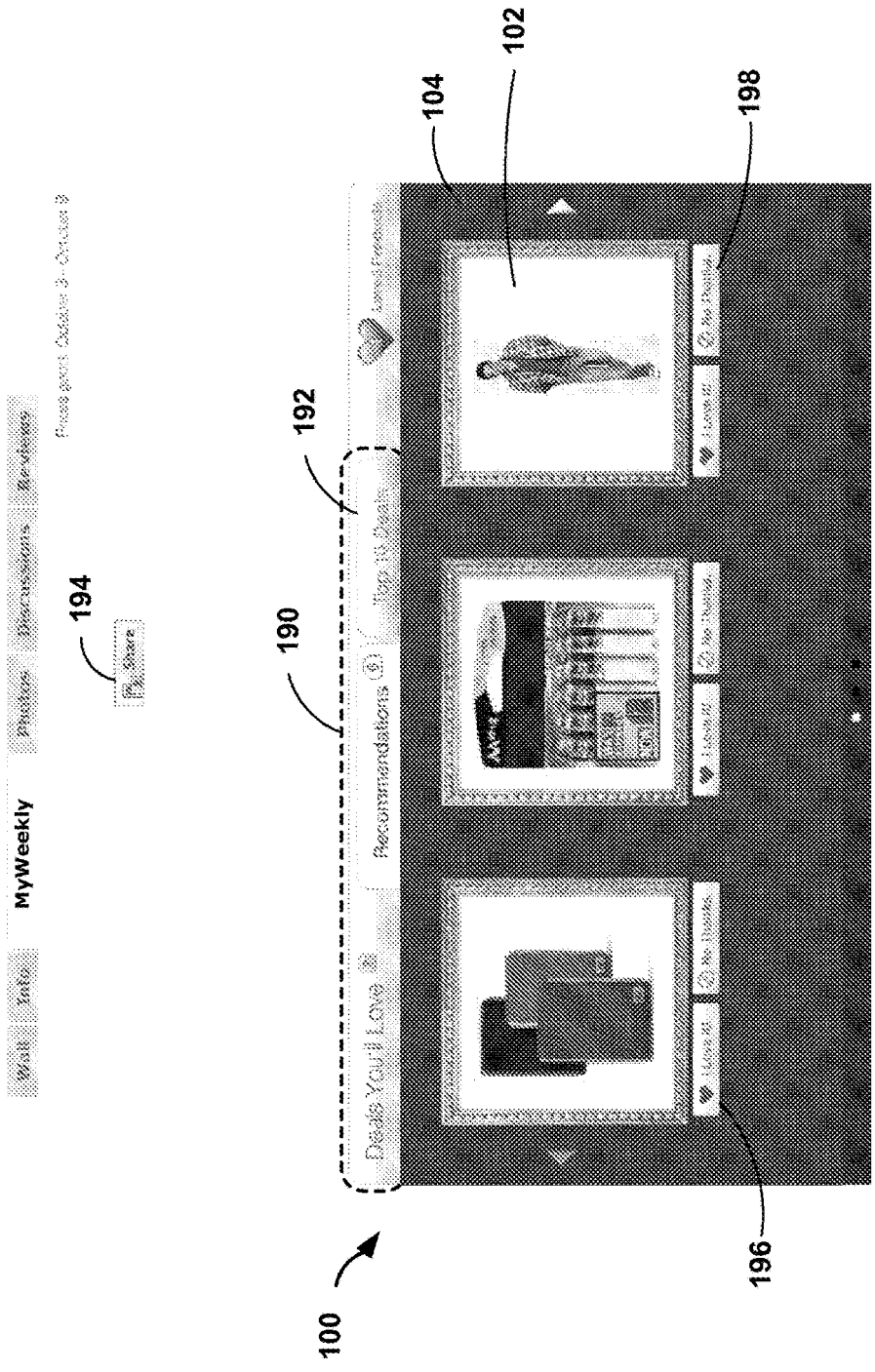

In some examples, the method of FIG. 3 may include publishing a user-defined e-periodical ad to a social network platform. In FIG. 11, e-weekly ad 100 is published to an example social network platform. E-weekly ad 100 is presented by the social network platform in FIG. 11. In some examples, e-weekly ad 100, and modules 104 including offers 102 may be presented by a social network platform in similar arrangements as those described with reference to the presentation of the ad by My WeeklyAd. However, as illustrated in FIG. 11, in another example, a social network platform may present e-weekly ad 100 differently than My WeeklyAd. In the example of FIG. 11, the example social network platform presents modules 104 of e-weekly ad 100 in a series of tabs 190. Each respective one of modules 104 of e-weekly ad 100 may be accessed and viewed by selecting an associated one of tabs 190. For example, a "Top 10 Deals" module can be accessed by clicking tab 192 in the example of FIG. 11. In another example, e-weekly ad 100 may be presented by a social network platform with modules 104 in a different arrangement. For example, modules 104 may be presented stacked individually with respect to one another in a column, which may be navigated using, e.g., a scroll bar. In such an example, modules 104 may be edited in the social network platform, e.g., by moving one or more of the modules up or down in the column of stacked modules.

Social network platforms integrated with My WeeklyAd may provide additional controls for interacting with e-weekly ad 100, including, e.g., share button 194 for sharing part or the entire ad with friends or other members of a social network. In this manner, the social network platform may be configured to present e-weekly ad 100 publicly such that user-defined ad content is shared among a group of users. Additionally, the social network platform may be configured to rate one or more of offers 102 in e-weekly ad 100. For example, in FIG. 11, one or more of offers 102 may be rated, either "I Love it!" or "No Thanks" using rating buttons 196 and 198, respectively. As with other aspects of e-weekly ad 100, the social network platform may be configured to present offer ratings publicly such that the ratings are shared among a group of users.

Figure 12:
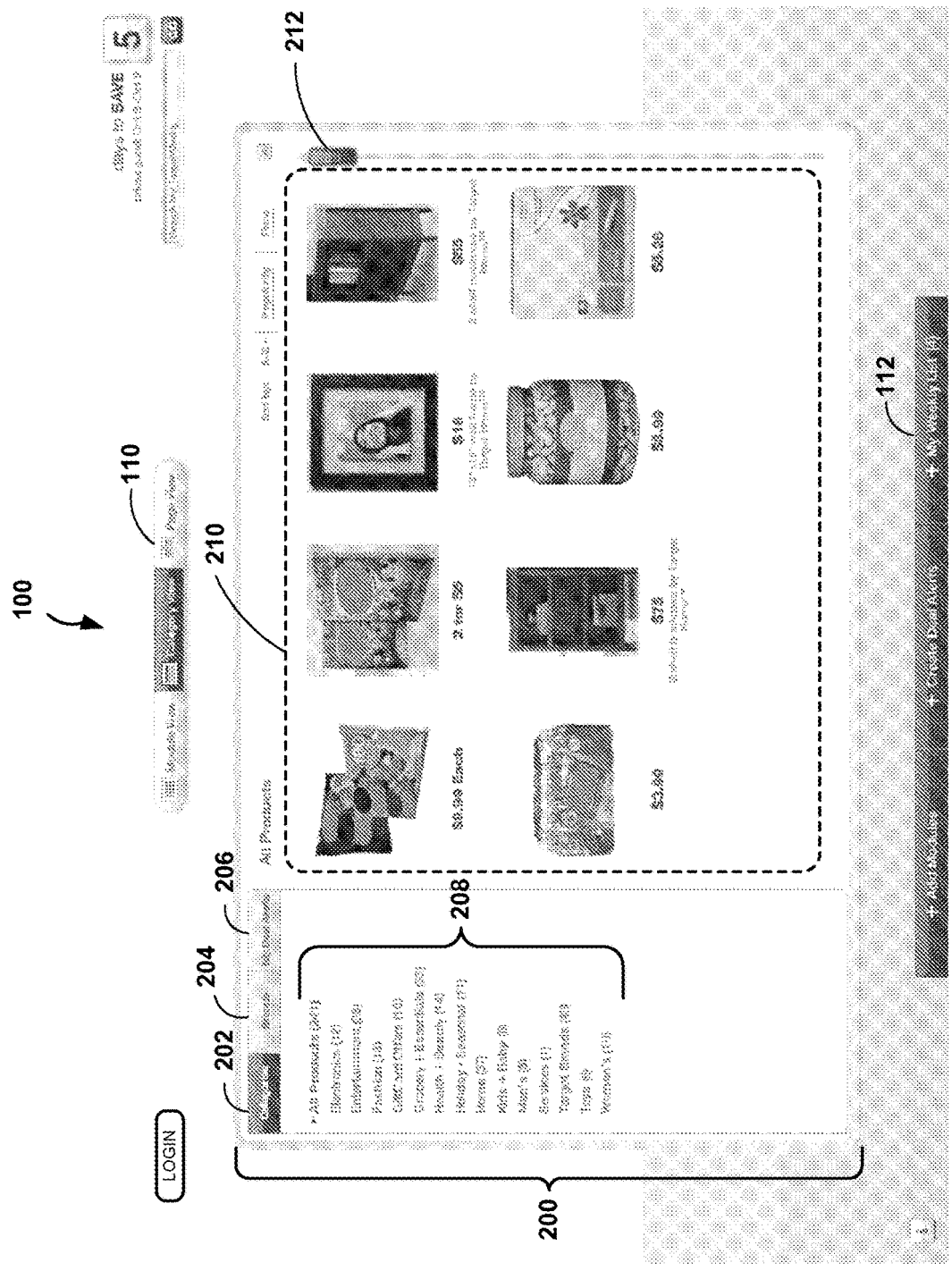
Figure 13:
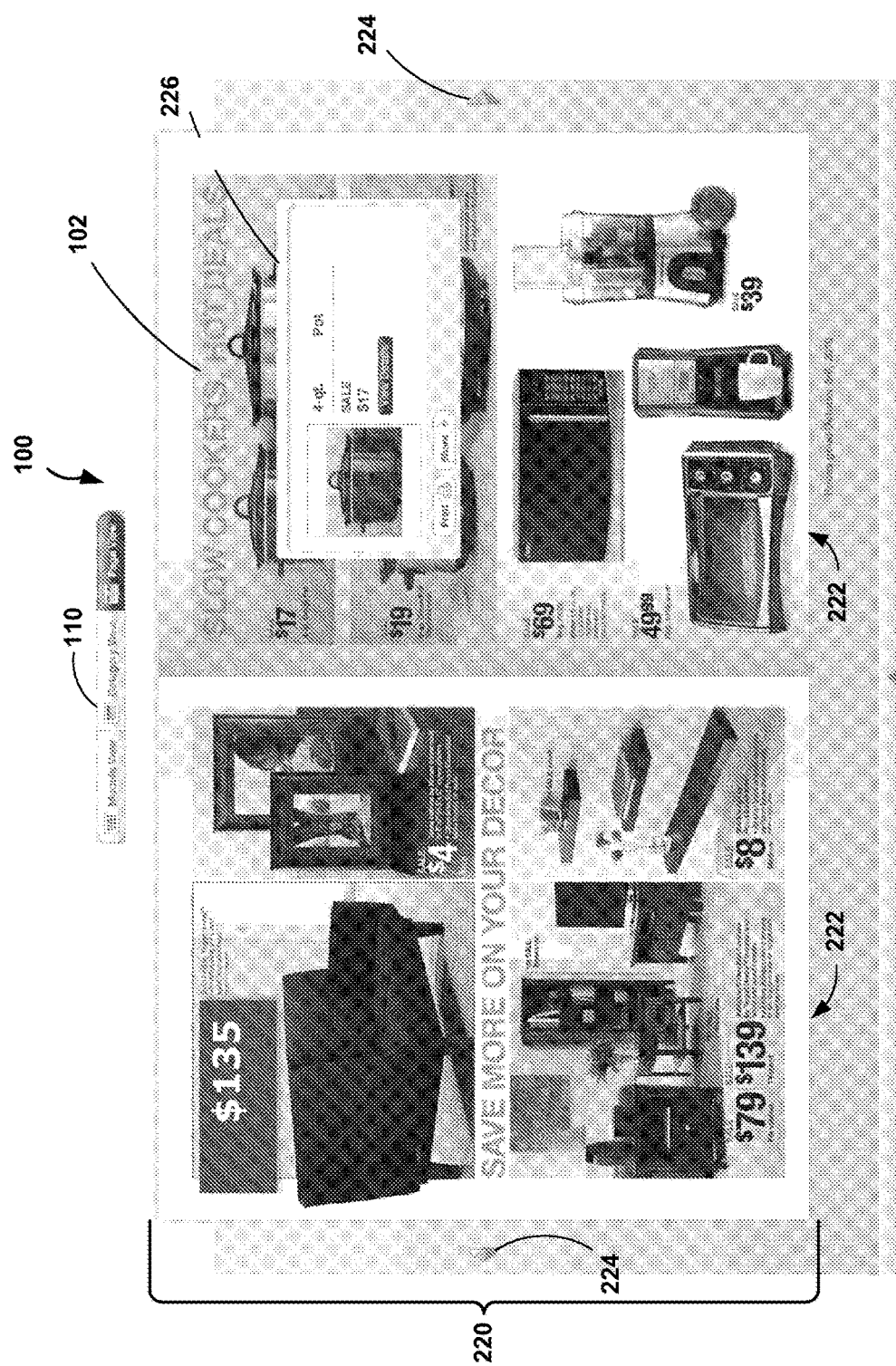

FIGS. 12 and 13 are images illustrating alternative presentation paradigms for e-weekly ad 100 using My WeeklyAd. In FIG. 12, e-weekly ad 100 is presented, not in a number of modules, but in a hierarchical tree structure by which different groups and sub-groups of offers may be selected for viewing in a viewing space that may be, depending on the number of offers in a particular category, indexed using a scroll bar. In the example of FIG. 12, menu 200 includes three different first-level offer groups, product categories group 202, product brands group 204, and my deal alerts 206. However, in other examples, menu 200, or a similar hierarchical tree menu may include fewer or more first-level offer groups. Each of the groups, 202, 204, and 206, in menu 200 may be access via the tabs across the top of the menu in FIG. 12. Additionally, groups 202, 204, 206 in menu 200 may, in some examples, include sub-groups of offers. For example, product categories group 202 includes an all products, electronics, entertainment, fashion, and a number of other sub-categories of product offers 208. Once one of groups 202, 204, 206 and sub-groups, e.g. one of sub-categories 208 in menu 200 is selected, e-weekly ad 100, in the example of FIG. 12, presents offers 102 corresponding to the selected group/sub-group in viewing space 210, which may be indexed using scroll bar 212.

FIG. 13 is an image illustrating e-weekly ad 100 presented by My WeeklyAd in page view 220. My WeeklyAd provides some interactivity via page view 220 presentation of e-weekly ad 100. For example, pages 222 in page view 220 may be indexed forward and backward, right and left, respectively, in the view of FIG. 13, using arrows 224. Additionally, individual offers 102 on one of pages 222 may be selected to access additional information, including, e.g., via pop-up page 226 illustrated in FIG. 13. At any time, e-weekly ad 100 may switch between presentation paradigms, e.g. module, category, and page views illustrated in FIGS. 4-10, 12, and 13, respectively, using view menu 110.

Various examples have been described. These and other examples are within the scope of the following claims.

The invention claimed is:

1. A non-transitory computer-readable storage medium comprising instructions that, when executed, cause at least one processor of a computing device to:
generate an interactive electronic periodical advertisement on a graphical user interface of a device of a customer of at least one retailer, the interactive electronic periodical advertisement being configured to allow the customer to create a customized electronic periodical advertisement, the interactive electronic periodical advertisement including:
a plurality of default modules in a first display area of the interactive electronic periodical advertisement, each of the plurality of default modules including at least one product offer;
an interactive customization control including at least an add module control that the customer can activate to add one or more customer selected modules having at least one product offer to the first display area of the interactive electronic periodical advertisement, the add module control further being configured such that when activated an interactive module addition pane is displayed to the user while at least one of the plurality of default modules is displayed to the user; and,
the interactive customization control further including at least one of the following:
(i) a shopping list control, the shopping list control is configured such that upon activation by the customer an interactive shopping list pane is presented to the customer by which the customer can create a personalized shopping list; and
(ii) an alerts control, the alerts control is configured such that upon activation by the customer an interactive alerts pane is presented to the customer, the interactive alerts pane includes an alerts menu that allows the customer to create alerts for product offers and set delivery preference for any alert created.

2. The non-transitory computer-readable storage medium of claim 1, wherein the interactive module addition pane is configured to allow a user to add one or more non-default modules to the first display area by dragging a non-default module in the interactive module addition pane to the first display area.

3. The non-transitory computer-readable storage medium of claim 2, wherein each default module and each non-default module includes a first portion, each first portion when activated by the customer removes the corresponding module from a corresponding portion of the interactive electronic periodical advertisement.

4. The non-transitory computer-readable storage medium of claim 3, wherein the interactive customization control includes the shopping list control.

5. The non-transitory computer-readable storage medium of claim 4, wherein the interactive shopping list pane is further configured to allow the customer to add one or more product offers to a customer shopping list by dragging a product offer from the first display area to the interactive shopping list pane.

6. The non-transitory computer-readable storage medium of claim 5, wherein the interactive electronic periodical advertisement further includes an interactive view control, the interactive view control is configured to enable the customer to change between a module view and a second view, the second view is a view different from the module view.

7. The non-transitory computer-readable storage medium of claim 6, wherein the interactive view control is configured to enable the customer to display the interactive electronic periodical advertisement in a module view, a category view and a page view,
when the module view has been selected by the customer, all product offers in the interactive electronic periodical advertisement are presented in a product offer module, each product offer module is an interactive panel that includes at least one product offer,
when the category view has been selected by the customer the product offers in the interactive electronic periodical advertisement are displayed in a viewing area having a scroll bar adjacent a hierarchical tree, the hierarchical tree including a listing of items identifying different groups and sub-groups of product offers and when the customer selects a first item from the hierarchical tree, product offers corresponding to the first item are displayed in the viewing area.

8. The non-transitory computer-readable storage medium of claim 4, wherein the interactive customization control includes the alerts control.

9. The non-transitory computer-readable storage medium of claim 1, wherein the interactive module addition pane includes a plurality of non-default modules.

10. A computer system comprising:
an ad server configured to communicate with at least one user device, the ad server including a periodical ad engine configured to cause the ad server to:
generate an interactive default electronic periodical advertisement including a plurality of offers, the interactive default electronic periodical advertisement further including:
a plurality of default modules in a first display area of the interactive default electronic periodical advertisement, each of the plurality of default modules including at least one offer;
customization controls allowing a user to customize the interactive default electronic periodical advertisement, the customization controls including at least each of the following:
(i) a shopping list control, the shopping list control is configured such that upon activation by the user an interactive shopping list pane is presented to the user by which the user can create a personalized shopping list, wherein upon activation of the shopping list control the interactive shopping list pane is displayed to the user while at least one of the plurality of default modules is displayed to the user; and
(ii) an alerts control, the alerts control is configured such that upon activation by the user an interactive alerts pane is presented to the user, the interactive alerts pane includes an alerts menu that allows the user to create alerts for product offers and set delivery preference for any alert created, wherein upon activation of the alerts control, the interactive alerts pane is displayed to the user while at least one of the plurality of default modules is displayed to the user.

11. The computer system of claim 10, wherein the interactive shopping list pane further includes an expiration time display for one or more offers displayed in the shopping list pane.

12. The computer system of claim 11, wherein the user interacting with one or more offers in the first display area includes the user dragging an offer from the first display area to the interactive shopping list pane.

13. The computer system of claim 10, wherein the interactive shopping list pane is further configured to allow the user to add one or more offers to a user shopping list by the user interacting with one or more offers in the first display area.

14. The computer system of claim 10, wherein interactive alerts pane displays to the user product categories and subcategories of products.

15. A computer-implemented method including:
providing an ad server configured to communicate with at least one user device, the ad server including a periodical ad engine configured to cause the ad server to generate an interactive electronic periodical advertisement including a plurality of offers, the interactive electronic periodical advertisement further including a plurality of interactive modules in a first display area of the interactive electronic periodical advertisement, each of the plurality of interactive modules including a plurality of offers; and,
displaying to a user the interactive electronic periodical advertisement with one or more customization controls allowing the user to customize the interactive electronic periodical advertisement, the one or more customization controls including a shopping list control, the shopping list control is configured such that upon activation by the user an interactive shopping list pane is displayed to the user while at least one of the plurality of default modules is displayed to the user by which the user can create a personalized shopping list by interacting with one or more of the plurality of interactive modules in the first display area of the interactive electronic periodical advertisement to add one or more offers to the personalized shopping list displayed in the interactive shopping list pane.

16. The computer-implemented method of claim 15 wherein the one or more customization controls further includes an alerts control, and the alerts control is configured such that upon activation by the user an interactive alerts pane is presented to the user.

17. The computer-implemented method of claim 16 wherein the interactive alerts pane includes an alerts menu that allows the user to create alerts for one or more offers in the personalized shopping list.

18. The computer-implemented method of claim 17 wherein the alerts menu further allows the user to set a delivery preference for any alert created.

19. The computer-implemented method of claim 18 wherein the alerts menu is configured to display to the user a plurality of product categories and sub-categories.

20. The computer-implemented method of claim 19 wherein the alerts menu further includes a user alert display portion displaying an alert created by the user, the user alert display portion including an interactive section which when activated by the user causes the user created alert displayed in the user alert display portion to be saved.

* * * * *